Figure 1:
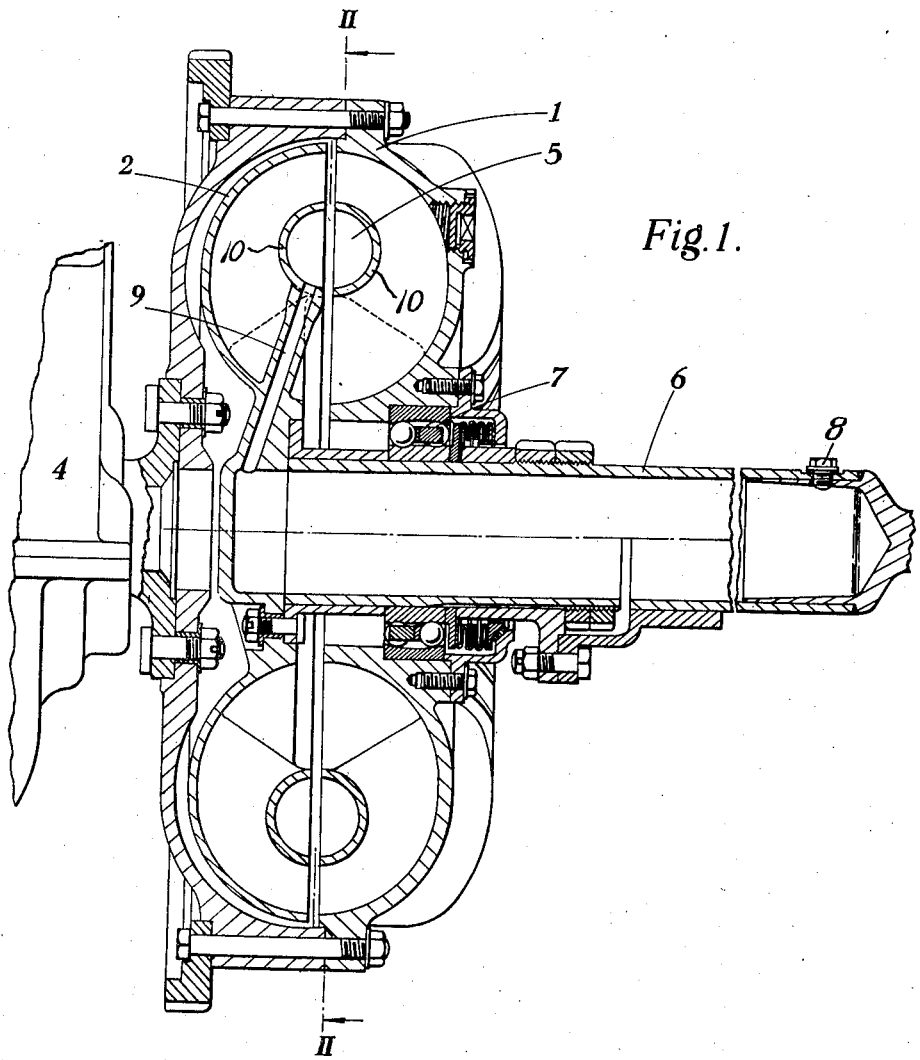

June 13, 1933.　　L. H. POMEROY ET AL　　1,914,289
POWER TRANSMISSION MECHANISM
Filed April 21, 1932　　2 Sheets-Sheet 1

INVENTORS
Laurence Henry Pomeroy,
and Alfred Blundell,
BY
ATTORNEYS

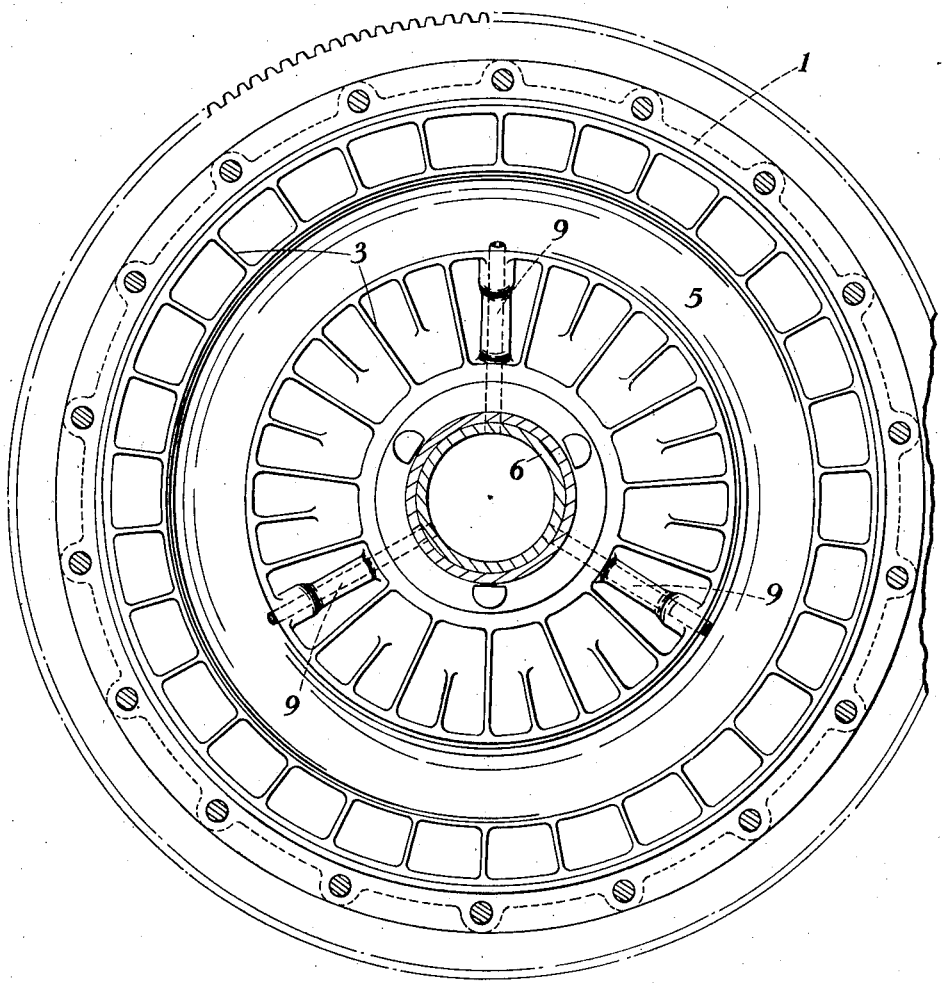

Patented June 13, 1933

1,914,289

UNITED STATES PATENT OFFICE

LAURENCE HENRY POMEROY AND ALFRED BLUNDELL, OF COVENTRY, ENGLAND, ASSIGNORS TO THE DAIMLER COMPANY LIMITED, OF COVENTRY, ENGLAND, A COMPANY OF GREAT BRITAIN

POWER TRANSMISSION MECHANISM

Application filed April 21, 1932, Serial No. 606,740, and in Great Britain May 9, 1931.

This invention relates to the hydraulic transmission of power and more particularly to hydraulic couplings used for this purpose which are generally known as fluid fly-wheels.

These so-called fluid fly-wheels consist essentially of two elements, namely, a primary rotor which is positively driven and a secondary rotor which transmits the drive from the primary rotor through the medium of a liquid circulating in a closed circuit inside a casing enclosing the two rotors. The action of the fluid fly-wheel is due to the difference of head maintained by the centrifugal action imparted to it by the rotation of the primary rotor.

These fluid fly-wheels can be used for a large number of purposes, for example, a particularly convenient method of applying it to the transmission of power in a motor road vehicle is described in United States Patent No. 1,885,746. It could also be used in connection with rail vehicles and in all sorts of industrial applications.

During the normal working of these hydraulic couplings the temperature of the liquid which is usually oil may increase to such an extent that an undue pressure is caused within its casing. This may lead to distortion of the casing and in any case reduces the efficiency of transmission. On the other hand, if the casing is not entirely full of a working liquid, then again there is a loss of efficiency so that for the coupling to work efficiently under all conditions provision should be made for always keeping the casing enclosing the rotors full of the working liquid, while preventing the pressure inside it from getting too high. The object of the present invention is to provide means for ensuring these conditions.

In accordance with the invention a centrally disposed reservoir is provided which communicates with the interior of the vortex ring around which the liquid circulates through one or more passages which extend across but do not communicate with the circuit. The pressure within the casing is a minimum within the vortex ring when the coupling is rotating, and it is found that if initially the casing and the reservoir together contain a quantity of liquid sufficient to fill the casing alone, all this liquid is transferred to the casing, and all the air in the casing is transferred to the reservoir, immediately the coupling is rotated.

In order that the invention may be thoroughly understood and more readily carried into effect, an example of construction in accordance therewith will now be described in some detail with reference to the accompanying drawings, in which:—

Figure 1 is a cross-section of an hydraulic coupling of the fluid fly-wheel type transmitting the power of the engine of a motor road vehicle, and Figure 2 is a section on the line II—II of Figure 1.

The hydraulic coupling shown in the drawings is of a well known type. It has a primary rotor 1 which forms a casing for a secondary rotor 2 and is filled with a liquid, generally oil. The two rotors 1 and 2 have vanes 3 and the primary rotor 1 is driven, as by the engine 4, so that the oil circulates in a closed circuit in the casing and constitutes the sole driving means for the secondary rotor 2. The construction of the rotors is best seen from Figure 2 and it will be seen that the vanes 3 of each rotor carry a ring 10 of semicircular cross-section these two rings facing each other and enclosing a toric space 5 usually referred to as the vortex ring.

In the construction illustrated, the secondary rotor 2 is bolted to a hollow shaft 6 which has a ball bearing 7 on which the primary rotor 1 rotates.

During running the temperature of the oil in the coupling naturally rises and, therefore, the pressure inside the casing also rises and to prevent loss of oil all joints have to be very carefully sealed. However, if the oil is thus prevented from escaping the pressure even under normal running conditions may rise to such an extent that the casing is deformed.

This difficulty can be guarded against to some extent by not filling the casing completely, but this is not very satisfactory as the presence of air in the oil may cause the coupling to perform inefficiently. Further, if, for example, the coupling is used as a unit in the transmission gear of a road vehicle it quite frequently happens that the vehicle is left at rest with the engine running and the gears engaged, in which circumstances there is a considerable relative movement between the two rotors 1 and 2, and, therefore, a considerable churning of the oil. This in turn may lead to such a rise in temperature that the expedient of only partially filling the casing of the coupling is of no use whatever.

The difficulty may be got over by a construction as shown in the drawings in which the hollow shaft 6 carrying the secondary rotor 2 is used as an expansion chamber into which the excess volume of oil from the casing can flow. This hollow shaft 6 is provided with a feed hole normally closed by a plug 8 through which it is filled and communicates with the inside of the casing by means of passages 9. When, therefore, the temperature of the oil rises and causes the oil to expand the excess is forced through these passages 9 into the hollow shaft 6.

It is also important always to keep the casing filled with oil during running. If then on starting up the casing is not full, oil will be delivered by centrifugal force into it from the hollow shaft 6. In this way the amount of oil in the casing is kept substantially constant under all conditions of running.

The passages 9 lead from the hollow shaft 6 to the vortex ring 5. As will be seen, they extend across, but do not communicate with, the space between the blades 3 in which the oil circulates and which constitutes the working circuit. This is the most advantageous arrangement because the pressure in the casing is a minimum within the vortex ring 5 and, therefore, oil is more easily injected by centrifugal force at points within it than elsewhere.

Any number of passages 9 may be used, but two or three are usually found sufficient.

The length of the shaft 6 which is made hollow is purely a mater of choice, but generally speaking it is advantageous to make it as long as possible so that a greater amount of oil can be stored in it and so that the latter in addition to being used as a make-up feed is also useful as a cooling medium.

We claim:

1. A hydraulic coupling comprising in combination a primary rotor, blades on said primary rotor for setting a liquid in motion in a closed circuit, a secondary rotor driven by said liquid, blades on said secondary rotor disposed immediately adjacent the blades on said primary rotor, two rings of curved cross-section each carried by the blades of one of the rotors and constituting a two-part vortex ring around which the liquid circulates, a reservoir for said liquid centrally disposed and rotating with one of said rotors, and at least one passage connecting said reservoir with the interior of said vortex ring, said passage extending across but not communicating with the said circuit.

2. A hydraulic coupling comprising in combination a primary rotor, blades on said primary rotor for setting a liquid in motion in a closed circuit, a rotary shaft having a space within it constituting a reservoir, a secondary rotor, carried by said shaft and driven by said liquid, blades on said secondary rotor disposed immediately adjacent the blades on said primary rotor, two rings of curved cross-section each carried by the blades of one of the rotors and constituting a two-part vortex ring around which the liquid circulates, and at least one passage connecting said reservoir with the interior of said vortex ring, said passage extending across but not communicating with the said circuit.

In witness whereof we hereunto subscribe our names, this 23rd day of February A. D. 1932.

L. H. POMEROY.
A. BLUNDELL.